(12) United States Patent
Nam et al.

(10) Patent No.: US 11,958,438 B2
(45) Date of Patent: Apr. 16, 2024

(54) SYSTEM FOR MANAGING A TRACTOR-TRAILER AND A METHOD FOR THE SAME

(71) Applicants: HYUNDAI MOTOR COMPANY, Seoul (KR); KIA CORPORATION, Seoul (KR)

(72) Inventors: Joo Han Nam, Hwaseong-si (KR); Jong Su Lim, Hwaseong-si (KR); Ki Beom Lee, Hwaseong-si (KR); Sang Hyu Lee, Incheon (KR); Hyun Jae Bang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 408 days.

(21) Appl. No.: 17/337,211

(22) Filed: Jun. 2, 2021

(65) Prior Publication Data

US 2022/0118942 A1 Apr. 21, 2022

(30) Foreign Application Priority Data

Oct. 19, 2020 (KR) .......................... 10-2020-0135369

(51) Int. Cl.
*B60R 25/08* (2006.01)
*B60R 25/102* (2013.01)
(Continued)

(52) U.S. Cl.
CPC ............ *B60R 25/08* (2013.01); *B60R 25/102* (2013.01); *B60T 8/1708* (2013.01); *G06Q 10/08* (2013.01);
(Continued)

(58) Field of Classification Search
CPC ..... B60R 25/08; B60R 25/102; B60T 8/1708; G06Q 50/28; G06Q 50/30;
(Continued)

(56) References Cited

U.S. PATENT DOCUMENTS 8,760,274 B2 * 6/2014 Boling ..................... G08G 1/20
340/933
10,858,053 B2 * 12/2020 Bean ..................... B62D 63/08
(Continued)

*Primary Examiner* — Brian P Sweeney
(74) *Attorney, Agent, or Firm* — Lempia Summerfield Katz LLC

(57) ABSTRACT

A system and method for managing a tractor-trailer and a method are provided. The system includes: a control server to manage a position of a trailer, identification information on the trailer, and identification information on a tractor matched to the trailer with respect to each hub; a trailer to authenticate the tractor by comparing the identification information, which is received from the control server, on the tractor, with identification information received from the tractor, and to release an electronic parking brake (EPB) when an authentication result for the tractor is correct; and a tractor to authenticate the trailer by comparing the identification information, which is received from the control server, on the trailer with identification information received from the trailer to authenticate the trailer, and to be coupled to the trailer, when an authentication result for the trailer is correct.

13 Claims, 4 Drawing Sheets

(51) Int. Cl.
*B60T 8/17* (2006.01)
*G06Q 10/08* (2023.01)
*G06Q 50/28* (2012.01)
*G06Q 50/30* (2012.01)
*G06Q 50/40* (2024.01)
*G05D 1/00* (2006.01)
*H04L 67/12* (2022.01)

(52) U.S. Cl.
CPC .......... *G06Q 50/40* (2024.01); *G05D 1/0225* (2013.01); *H04L 67/12* (2013.01)

(58) Field of Classification Search
CPC ....... G06Q 10/06312; G06Q 10/06314; G06Q 10/0633; G06Q 10/087; G06Q 10/10; G05D 1/0225; G05D 2201/0213; H04L 67/12; H04L 63/0876; H04L 67/025; H04W 4/40; H04W 12/06; H04W 4/44
See application file for complete search history.

(56) References Cited

U.S. PATENT DOCUMENTS

2016/0304054 A1* 10/2016 Mansuri ................ B60R 25/102
2020/0269822 A1* 8/2020 Magzimof ............ B60T 13/662

* cited by examiner

SYSTEM FOR MANAGING A TRACTOR-TRAILER AND A METHOD FOR THE SAME

CROSS-REFERENCE TO RELATED APPLICATION

This application claims the benefit of priority to Korean Patent Application No. 10-2020-0135369, filed in the Korean Intellectual Property Office on Oct. 19, 2020, the entire contents of which are incorporated herein by reference.

TECHNICAL FIELD

The present disclosure relates to a technology of managing the coupling between a tractor and a trailer under a hub-to-hub logistics transportation environment.

BACKGROUND

Recently, there has been suggested an automatic transportation system between logistics hubs, capable of being eco-friendly and automatically making or providing logistics transportation between the logistics hubs by using an automated guided vehicle. Thus, the system aims at green logistics and reducing a transport share rate of a freight vehicle, such that the congestion rate of roads may be reduced and the problem related to the accessibility of a rail transportation may be supplemented.

Such an automatic transportation system between the logistics hubs includes: a dedicated road with a number of transducers buried underground; an automatic guided vehicle, which transports containers while traveling on the dedicated road; a vehicle traveling between logistics hubs, with containers transported and loaded thereon by the automatic guided vehicle; and a control tower to control the traveling of the automatic guided vehicle and the vehicle.

In this case, the vehicle includes a trailer to move and load a container transported by the automatic guided vehicle and a tractor coupled to a front surface or front end of the trailer to carry the container. In addition, the trailer includes a frame having a spaced part formed therein to allow the automatic guided vehicle, which has containers loaded thereon, to enter. The trailer also includes a wheel coupled to a lower portion of the frame, a lift device provided at an upper portion of the frame to fixedly support the containers, and couplers provided on at opposite end portions of the frame.

The automatic transportation system between the logistics hubs does not authenticate a tractor when the tractor is coupled to the trailer and does not manage information on the trailer to be transported by the tractor.

In addition, the automatic transportation system between the logistics hubs does not make or provide communication with the tractor and the trailer and is not involved in releasing an Electronic Parking Brake (EPB) provided on the trailer.

Specifically, in the automatic transportation system between the logistics hubs, the tractor does not make or provide communication with the trailer and the tractor and the trailer do not authenticate counterparts thereof. Accordingly, the tractor may transport another trailer, instead of a trailer designated to the tractor.

The matter described in the "Background" is provided for the convenience of explanation and may include matters other than a related art well known to those having ordinary skill in the art.

SUMMARY

The present disclosure has been made to solve the above-mentioned problems occurring in the prior art while advantages achieved by the prior art are maintained intact.

An aspect of the present disclosure provides a system for controlling a tractor-trailer and a method for the same. The system and the method are capable of transmitting information on a trailer to a tractor, which is authenticated by a control server. The system and the method are capable of transmitting information on the tractor to the trailer. The system and the method are capable of allowing the trailer to release an Electronic Parking Brake (EPB) when authenticating the tractor as being correct. The system and the method are capable of allowing the tractor to be coupled to the trailer when authenticating the trailer as being correct. Thus, the system and the method may basically prevent the incorrect coupling between the tractor and the trailer.

The technical problems to be solved by the present disclosed are not limited to the aforementioned problems. Any other technical problems not mentioned herein should be clearly understood from the following description by those having ordinary skill in the art to which the present disclosure pertains. In addition, it should be easily understood that the objects and the features of the present disclosure may be realized by means and the combination of the means claimed in the appended claims.

According to an aspect of the present disclosure, a system for managing a tractor-trailer may include a control server to manage a position of a trailer, identification information on the trailer, and identification information on a tractor matched to the trailer with respect to each hub. The trailer may authenticate the tractor by comparing the identification information, which is received from the control server, on the tractor, with identification information received from the tractor and may release a parking brake when an authentication result for the tractor is correct. The tractor may authenticate the trailer by comparing the identification information, which is received from the control server, on the trailer with identification information received from the trailer to authenticate the trailer. The tractor may be coupled to the trailer, when an authentication result for the trailer is correct.

According to an embodiment of the present disclosure, the control server may transmit, to the tractor, information on the trailer matched to the tractor and transmit the identification information on the tractor to the trailer, when the tractor is a vehicle correctly registered.

According to an embodiment of the present disclosure, the tractor may be authenticated by transmitting the identification information on the tractor to the control server.

According to an embodiment of the present disclosure, the tractor may tow the trailer, when receiving a parking brake release signal from the trailer.

According to an embodiment of the present disclosure, the trailer may maintain a setting state of the parking brake, when the trailer is not coupled to the tractor within a reference time after authenticating the tractor.

According to an embodiment of the present disclosure, the tractor may include a coupling device coupled to the trailer. The tractor may also include a first communication device to transmit the identification information on the tractor to the control server and to receive the identification information on the trailer from the control server. The tractor may also include a second communication device to transmit the identification information on the tractor to the trailer, to receive the identification information on the trailer from the trailer, and to receive a parking brake release signal from the trailer. The tractor may also include a controller to transmit the identification information on the tractor to the control server such that the tractor is authenticated. The controller may also authenticate the trailer by comparing the identification information, which is received from the control server, on the trailer with the identification information received the trailer. The controller may also control the coupling device to be coupled to the trailer, when the authentication result for the trailer is correct.

According to an embodiment of the present disclosure, the trailer may include a parking brake to set or release a locking state of the trailer. The trailer may also include a first communication device to receive the identification information on the tractor from the control server. The trailer may also include a second communication device to transmit the identification information on the trailer to the tractor and to receive the identification information on the tractor from the tractor. The trailer may also include a controller to authenticate the tractor by comparing the identification information, which is received from the control server, on the tractor with the identification information received from the tractor. The controller may also release the parking brake, when the authentication result for the tractor is correct.

According to an embodiment of the present disclosure, the controller may maintain a setting state of the parking brake, when the trailer is not coupled to the tractor within a reference time after authenticating the tractor.

According to an embodiment of the present disclosure, the tractor may be an autonomous vehicle.

According to another aspect of the present disclosure, a method for controlling a tractor-trailer may include authenticating, by a tractor, a trailer by comparing identification information, which is received from a control server, on the trailer with identification information received from the trailer. The method may also include allowing the tractor to be coupled to the trailer. The method may also include authenticating, by the trailer, the tractor by comparing identification information, which is received from the control server, on the tractor with identification information received from the tractor. The method may also include releasing, by the trailer, a parking brake.

According to an embodiment of the present disclosure, the method may include transmitting, by the tractor, the identification information on the tractor to the control server and receiving, by the tractor, the identification information on the trailer from the control server.

According to an embodiment of the present disclosure, the method may include notifying, by the trailer, the tractor that the parking brake is released.

According to an embodiment of the present disclosure, the method may further include maintaining, by the trailer, a setting state of the parking brake, when the trailer is not coupled to the tractor within a reference time after authenticating the tractor.

According to another aspect of the present disclosure, a method for managing a tractor-trailer may include receiving, by a trailer, identification information on a tractor from a control server. The method may also include receiving, by the trailer, identification information on the tractor from the tractor. The method may also include authenticating, by the trailer, the tractor by comparing the identification information, which is received from the control server, on the tractor with the identification information received from the tractor. The method may also include releasing, by the trailer, a parking brake, when an authentication result for the tractor is correct and notifying, by the trailer, the tractor of that the parking brake is released.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
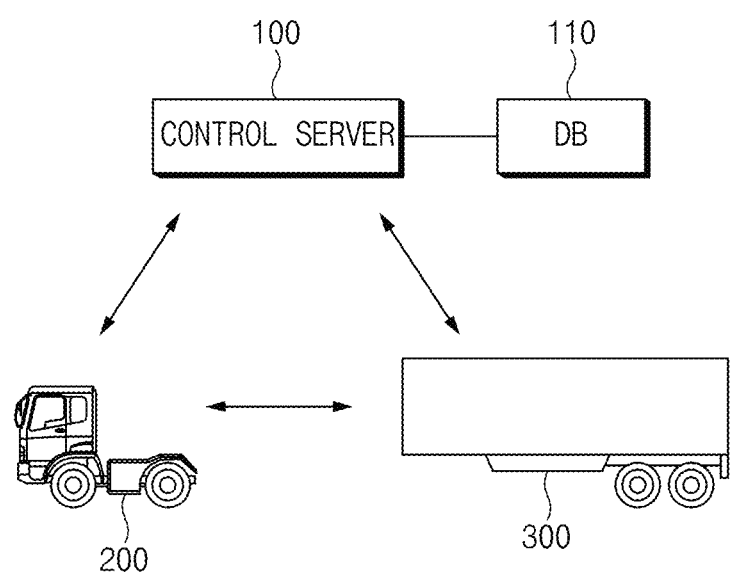
FIG. 1 is a block diagram illustrating a configuration of a system for managing a tractor-trailer, according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when the component is displayed on other drawings. Further, in describing the embodiment of the present disclosure, a detailed description of well-known features or functions has been omitted in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component and the terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings consistent with the contextual meanings in the relevant field of art. Such terms should not be interpreted as having ideal or excessively formal meanings unless clearly defined in the present application. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram illustrating a configuration of a system for managing a tractor-trailer, according to an embodiment of the present disclosure.

As illustrated in FIG. 1, according to an embodiment of the present disclosure, the system for managing the tractor-trailer may include a control server 100, a tractor 200, and a trailer 300.

Regarding the above components, the control server 100 is a device to mediate the coupling between the tractor 200 and the trailer 300 and may make or provide communication with the tractor 200 and the trailer 300 through various communication schemes.

The control server 100 may manage the position and the identification (ID) information on a trailer with respect to each of a plurality of hubs and may manage identification information on a tractor matched to the trailer. In this case, the hub may refer to a place in which a plurality of trailers are positioned.

The control server 100 may manage the trailer matched to the tractor through a database (DB) 110.

The control server 100 may perform a process of determining whether the tractor 200 is a vehicle previously registered, when receiving the identification information on the tractor 200. In this case, when the tractor 200 is a vehicle which is registered, the control server 100 may transmit, to the tractor 200, information (for example, position information or identification information on the trailer 300 in a hub) of the trailer 300 matched to the tractor 200 and may transmit the identification information on the tractor 200 to the trailer 300.

The tractor 200 may be implemented with an autonomous vehicle and may transport a trailer between hubs.

The tractor 200 may be authenticated by transmitting the identification information thereon to the control server 100 and may authenticate the trailer 300, based on the information, which is received from the control server 100, on the trailer 300 and the identification information received from the trailer 300.

The tractor 200 may be coupled to the trailer 300, when the authentication result for the trailer 300 is correct. In this case, the tractor 200 may transmit the authentication result to the control server 100.

The trailer 300 is a vehicle towed by the tractor 200 and may load various freights thereon through containers.

The trailer 300 may authenticate the tractor 200, based on the identification information, which is received from the control server 100, on the tractor 200 and the identification information received from the tractor 200.

The trailer 300 may release an Electronic Parking Brake (EPB) when the authentication result for the tractor 200 is correct and may transmit, to the tractor 200, an EPB release signal indicating that the EPB is released. In this case, the trailer 300 may release the EPB after further determining the coupling state with the tractor 200. For example, the trailer 300 may maintain the setting state of the EPB when the tractor 200 is not coupled to the tractor 200 within a reference time (for example, five minutes) after authenticating the tractor 200. To this end, the trailer 300 may further include a coupling detecting sensor (not illustrated).

In this case, the trailer 300 may transmit the authentication result to the control server 100. For reference, a release state of the EPB may refer to a state in which the trailer 300 is movable and the setting state of the EPB may refer to a state in which the trailer 300 is fixed.

Figure 2:
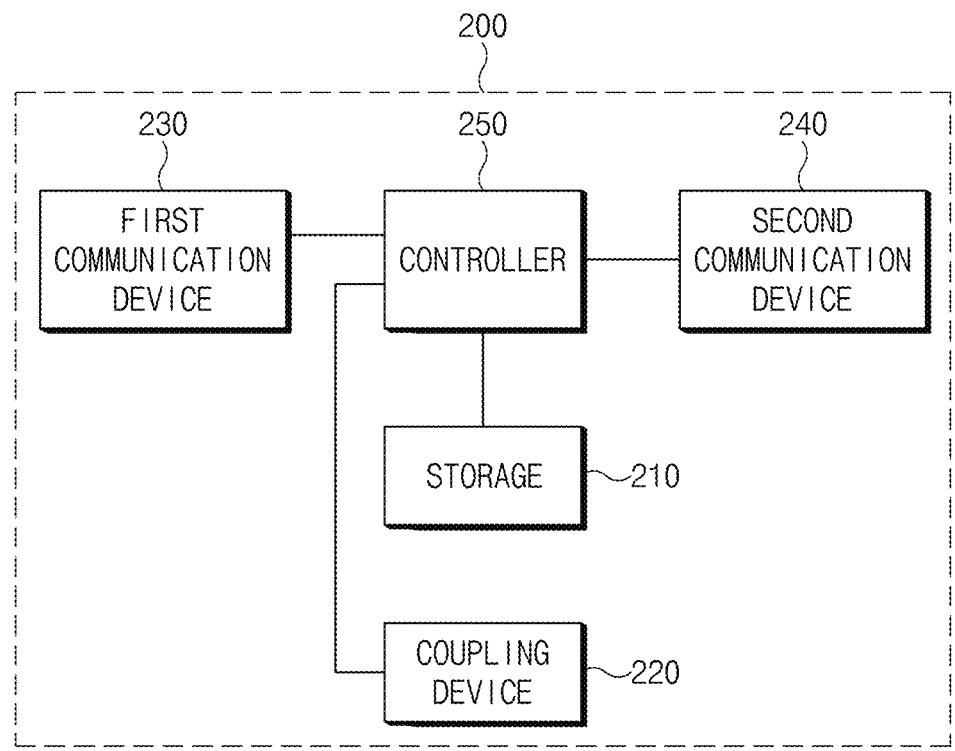
FIG. 2 is a view illustrating the configuration of a tractor provided in a system for managing a tractor-trailer, according to an embodiment of the present disclosure.

FIG. 2 is a view illustrating the configuration of a tractor provided in a system for managing a tractor-trailer, according to an embodiment of the present disclosure.

As illustrated in FIG. 2, according to an embodiment of the present disclosure, the tractor 200 provided in the system for managing the tractor-trailer may include a storage 210, a coupling device 220, a first communication device 230, a second communication device 240, and a controller 250. In this case, according to an embodiment of the present disclosure, the components may be combined into or with each other to be implemented in one form or some components may be omitted, depending on the manner of producing the tractor 200 provided in the system for managing the tractor-trailer.

Regarding the above components, the storage 210 may store various logics, various algorithms, and various programs required in following processes. The tractor 200 may be allowed to be authenticated by transmitting identification information on the tractor 200 to the control server 100. The tractor 200 may be allowed to authenticate the trailer 300 based on information, which is received from the control server 100, on the trailer 300 and identification information received from the trailer 300. The tractor 200 may be allowed to be coupled to the trailer 300 when the authentication result for the trailer 300 is correct.

The storage 210 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The coupling device 220 may be coupled to the trailer 300 under the control of the controller 250.

The first communication device 230 may transmit the identification information on the tractor 200 to the control server 100 and may receive the information on the trailer 300 from the control server 100. In addition, the first communication device 230 may transmit the authentication result for the trailer 300 to the control server 100.

The first communication device 230 is a module to provide a communication interface with the control server 100 and may include a mobile communication module and a wireless Internet module.

The mobile communication module may make communication with the control server 100 through a mobile communication network constructed depending on communication schemes (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or Long Term Evolution-Advanced (LTEA).

The wireless Internet module is a module for wireless Internet access and may make or provide communication, i.e., communicate, with the control server 100 through Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The second communication device 240 may transmit the identification information on the tractor 200 to the trailer 300 and may receive the identification information on the trailer 300 from the trailer 300. In addition, the second communication device 240 receives the EPB release signal from the trailer 300.

The second communication device 240 is a module to provide a communication interface with the trailer 300 and may include a short range communication module.

The short range communication module may make or provide communication, i.e., communicate, with the trailer 300 through at least one or more of a number of technologies, such as Bluetooth™, Radio Frequency Identification (RFID), Infrared Data Association (IrDA), Ultra Wideband (UWB), ZigBee, Near Field Communication (NFC), or Wireless Universal Serial Bus (USB).

The controller 250 may perform the overall control such that the components normally perform the respective functions. In addition, the controller 250 may be implemented in the form of hardware or software and may be implemented in the form of the combination of the hardware and the software. In an embodiment, the controller 250 may be implemented with a micro-processor, but the present disclosure is not limited thereto.

Specifically, the controller 250 may perform various control operations in the following processes. The tractor 200 may be allowed to be authenticated by transmitting identification information on the tractor 200 to the control server 100. The tractor 200 may be allowed to authenticate the trailer 300 based on information, which is received from the control server 100, on the trailer 300 and identification information received from the trailer 300. The tractor 200 may be allowed to be coupled to the trailer 300 when the authentication result for the trailer 300 is correct.

The controller 250 may control the coupling device 220 to be coupled to the trailer 300, when the trailer 300 is authenticated as being correct.

Figure 3:
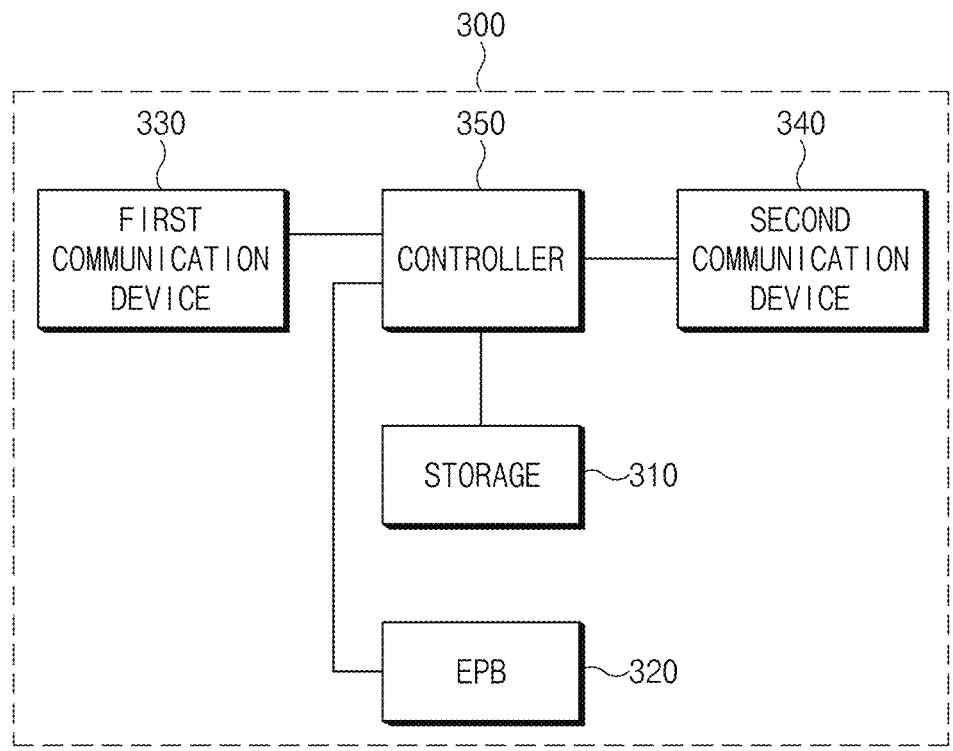
FIG. 3 is a view illustrating the configuration of a trailer provided in a system for managing a tractor-trailer, according to an embodiment of the present disclosure.

FIG. 3 is a view illustrating the configuration of a trailer provided in the system for managing the tractor-trailer, according to an embodiment of the present disclosure.

As illustrated in FIG. 3, according to an embodiment of the present disclosure, the trailer 300 provided in the system for managing the tractor-trailer may include a storage 310, an EPB 320, a first communication device 330, a second communication device 340, and a controller 350. In this case, according to an embodiment of the present disclosure, the components may be combined into or with each other to be implemented in one form or some components may be omitted, depending on the manner of producing the trailer 300 provided in the system for managing the tractor-trailer.

Regarding to the components, the storage 310 may store various logics, various algorithms, and various programs required in the following processes. The tractor 200 is authenticated based on identification information, which is received from the control server 100, on the tractor 200 and identification information received from the tractor 200. The EPB 320 is released when the authentication result for the tractor 200 is correct. The EPB release signal, indicating that the EPB 320 is released, is transmitted to the tractor 200. The setting state of the EPB 320 is maintained when the tractor 200 is not coupled within a reference time after the tractor 200 is authenticated.

The storage 310 may include various types of storage media the same as those of the storage 210 illustrated in FIG. 2.

The EPB 320 may set or release the locking state of the trailer 300 under the control of the controller 250.

The first communication device 330 may receive the identification information on the tractor 200 from the control server 100 and may transmit the authentication result for the tractor 200 to the control server 100.

The first communication device 330 is a module to provide the communication interface with the control server 100 and may include a mobile communication module and a wireless Internet module. The first communication device 330 is the same as the first communication device 230 illustrated FIG. 2.

The second communication device 340 may transmit the identification information on the trailer 300 to the tractor 200 and may receive the identification information on the tractor 200 from the tractor 200.

The second communication device 340 is a module to provide the communication interface with the tractor 200 and may include a short range communication module. The second communication device 340 is the same as that of the second communication device 240 illustrated in FIG. 2.

The controller 350 may perform the overall control such that the components normally perform the respective functions. In addition, the controller 350 may be implemented in the form of hardware or software and may be implemented in the form of the combination of the hardware and the software. In an embodiment, the controller 350 may be implemented with a micro-processor, but the present disclosure is not limited thereto.

Specifically, the controller 350 may perform various control operations required in the following processes. The tractor 200 may be authenticated based on identification information, which is received from the control server 100, on the tractor 200 and identification information received from the tractor 200. The EPB 320 may be released when the authentication result for the tractor 200 is correct. The EPB release signal, indicating that the EPB 320 is released, may be transmitted to the tractor 200. The setting state of the EPB 320 may be maintained when the tractor 200 is not coupled within a reference time after the tractor 200 is authenticated.

The controller 350 may control the EPB 320 to release the locking state, when the tractor 200 is authenticated as being correct.

Figure 4:
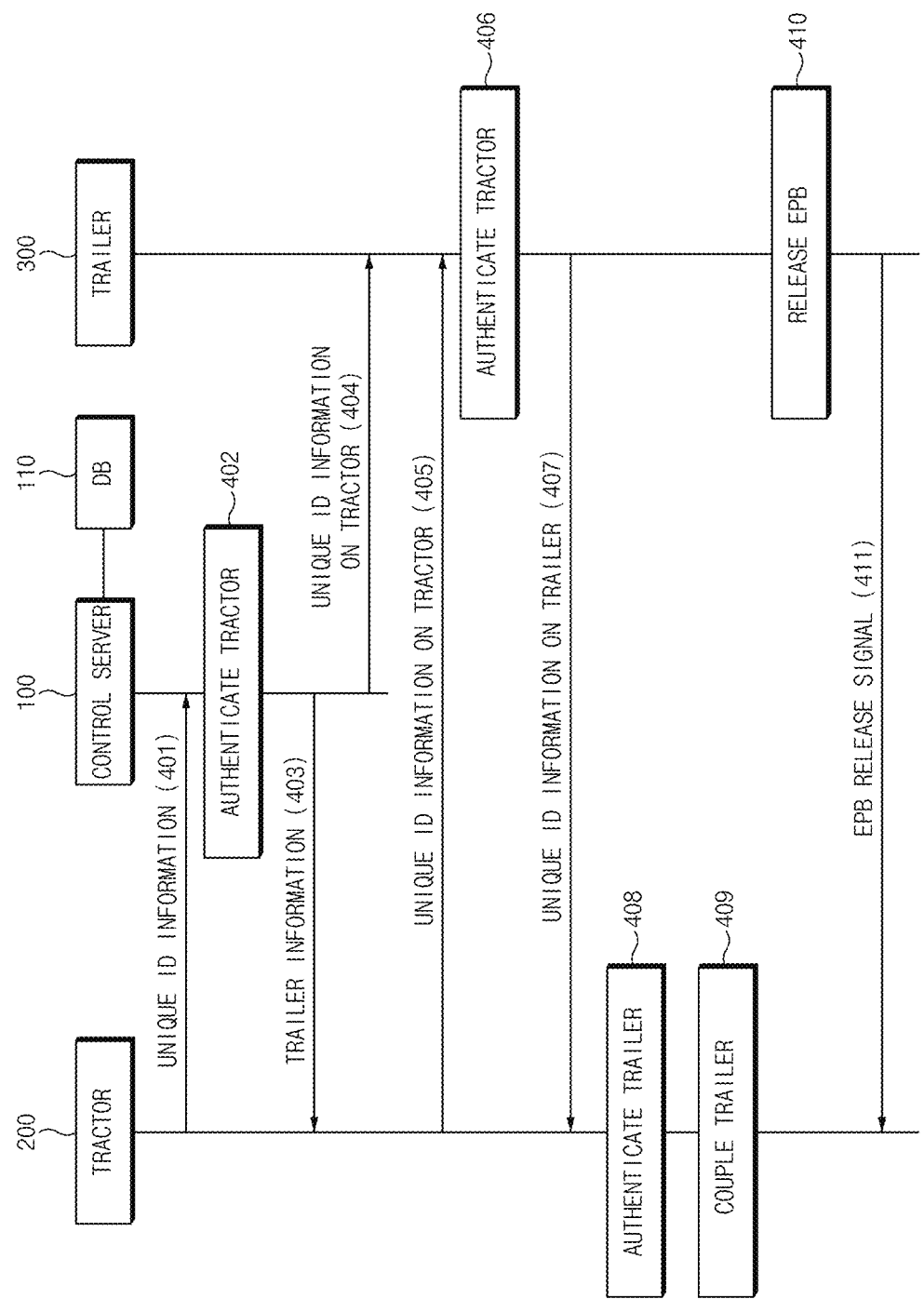
FIG. 4 is a flowchart illustrating a method for managing a tractor-trailer, according to an embodiment of the present disclosure.

FIG. 4 is a flowchart illustrating a method for managing a tractor-trailer, according to an embodiment of the present disclosure, in which the tractor 200 may be referred to as the "controller 250" and the trailer 300 may be referred to as the "controller 350".

First, the tractor 200 transmits the identification information thereon to the control server 100 (401).

Then, the control server 100 authenticates the tractor 200, based on identification information on each of tractors registered in the DB 110 (402). In this case, the control server 100 terminates communication with the tractor 200, when the authentication for the tractor 200 is failed.

When the authentication result of the tractor 200 is correct in 402, the control server 100 transmits information on the trailer 300 matched to the tractor 200, which is recorded in the DB 110, to the tractor 200 (403).

In addition, the control server 100 transmits the identification information on the tractor 200 to the trailer 300 (404).

Thereafter, the tractor 200 transmits the identification information thereon to the trailer 300 (405).

Then, the trailer 300 may authenticate the tractor 200, by comparing the identification information, which is received from the control server 100, on the tractor 200 with the identification information received from the tractor 200 (406). In this case, when the authentication for the tractor 200 is failed, the trailer 300 terminates the subsequent processes.

When the authentication result for the tractor 200 is correct in 406, the trailer 300 transmits the identification information thereon to the tractor 200 (407). In this case, the trailer 300 may transmit the identification information thereon to the tractor 200 before authenticating the tractor 200.

Then, the tractor 200 may authenticate the trailer 300, by comparing the identification information, which is received from the control server 100, on the trailer 300 with the identification information received from the trailer 300 (408). In this case, when the authentication for the trailer 300 is failed, the tractor 200 terminates the following processes.

When the authentication result for the trailer 300 is correct in 408, the tractor 200 may perform the coupling to the trailer 300 (409).

When the coupling is completed as described above, the trailer 300 releases the EPB 320 (410). When the coupling is not completed, the trailer 300 maintains the setting state of the EPB 320. In this case, the trailer 300 may recognize that coupling is completed through a coupling completion signal received from the tractor 200 or may recognize that the coupling is completed through a sensor to sense the coupling state.

When the EPB 320 is completely released in 410, the trailer 300 transmits the EPB release signal to the tractor 200 (411). Then, the tractor 200 may tow the trailer 300.

As described above, according to an embodiment of the present disclosure, in the system for controlling the tractor-trailer and the method for the same, information on the trailer may be transmitted to the tractor, which is authenticated as being correct by the control server, information on the tractor may be transmitted to the trailer, the trailer may release an EPB when authenticating the tractor as being correct, and the tractor may be coupled to the trailer when authenticating the trailer as determined to be correct. Thus, the system and the method may basically prevent the incorrect coupling between the tractor and the trailer.

As described above, according to an embodiment of the present disclosure, in the system for controlling the tractor-trailer and the method for the same, it is very difficult to forge information since the information is exchanged based on encrypted communication among the control server, the tractor, and trailer.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims. The controllers and first and second communication devices of the tractor and the trailer may be separately identified as "first" and "second", "tractor" and "trailer", or the like in order to distinguish the separate tractor and trailer components which otherwise are given the same or similar names herein.

Therefore, embodiments of the present disclosure are not intended to limit the technical spirit of the present disclosure but instead are provided only for illustrative purposes. The scope of protection of the present disclosure should be construed by the attached claims and all equivalents thereof should be construed as being included within the scope of the present disclosure.

What is claimed is:

1. A system for managing a tractor-trailer, the system comprising:
   a control server configured to manage a position of a trailer, identification information on the trailer, and identification information on a tractor matched to the trailer with respect to each hub;
   wherein the trailer includes:
   a parking brake configured to set or release a locking state of the trailer;
   a first communication device configured to receive the identification information on a tractor from the control server;
   a second communication device configured to receive the identification information on the tractor from the tractor; and
   a controller configured to authenticate the tractor by comparing the identification information, which is received from the control server, on the tractor with the identification information received from the tractor and configured to control the parking brake to release the locking state of the trailer, when an authentication result for the tractor is correct,
   wherein the tractor includes:
   a coupling device coupled to the trailer;
   a first communication device configured to receive the identification information on the trailer from the control server;
   a second communication device configured to receive the identification information on the trailer from the trailer; and
   a controller configured to authenticate the trailer by comparing the identification information, which is received from the control server, on the trailer with the identification information received the trailer, and configured to control the coupling device to be coupled to the trailer, when an authentication result for the trailer is correct.

2. The system of claim 1, wherein the control server is configured to:
   transmit, to the tractor, information on the trailer matched to the tractor and transmit the identification information on the tractor to the trailer, when the tractor is a vehicle correctly registered.

3. The system of claim 1, wherein the tractor is authenticated by transmitting the identification information on the tractor to the control server.

4. The system of claim 1, wherein the tractor tows the trailer, when receiving a parking brake release signal from the trailer.

5. The system of claim 1, wherein the trailer maintains a setting state of the parking brake, when the trailer is not coupled to the tractor within a reference time after authenticating the tractor.

6. The system of claim 1, wherein the controller is configured to control the parking brake to maintain a setting state of the trailer, when the trailer is not coupled to the tractor within a reference time after authenticating the tractor.

7. The system of claim 1, wherein the tractor is an autonomous vehicle.

8. A method for controlling a tractor-trailer, the method comprising:
   receiving, by a first communication device of a tractor, identification information on a trailer from a control server;
   receiving, by a second communication device of the tractor, identification information on the trailer from the trailer;
   authenticating, by a controller of the tractor, the trailer by comparing the identification information, which is received from the control server, on the trailer with the identification information received the trailer;
   coupling, by a coupling device of the tractor, to the trailer when an authentication result for the trailer is correct;

receiving, by a first communication device of the trailer, identification information on the tractor from the control server;

receiving, by a second communication device of the trailer, the identification information on the tractor from the tractor;

authenticating, by a controller of the trailer, the tractor by comparing the identification information, which is received from the control server, on the tractor with the identification information received from the tractor; and releasing, by a parking brake of the trailer, a locking state of the trailer.

9. The method of claim 8, wherein the authenticating of the trailer includes:

transmitting, by the tractor, the identification information on the tractor to the control server; and receiving, by the tractor, the identification information on the trailer from the control server.

10. The method of claim 8, wherein the releasing of the parking brake by the trailer includes:

notifying, by the trailer, the tractor that the parking brake is released.

11. The method of claim 8, further comprising:

maintaining, by the trailer, a setting state of the parking brake, when the trailer is not coupled to the tractor within a reference time after authenticating the tractor.

12. A method for managing a tractor-trailer, the method comprising:

receiving, by a first communication device of a trailer, identification information on the tractor from a control server;

receiving, by a second communication device of a trailer, the identification information on the tractor from the tractor;

authenticating, by a controller of the trailer, the tractor by comparing the identification information, which is received from the control server, on the tractor with the identification information received from the tractor;

releasing, by a parking brake of the trailer, a locking state of the trailer when an authentication result for the tractor is correct; and notifying, by the second communication device of the trailer, the tractor of that the parking brake is released.

13. The method of claim 12, further comprising:

maintaining, by the trailer, a setting state of the parking brake, when the trailer is not coupled to the tractor within a reference time after authenticating the tractor.

* * * * *